United States Patent
Oh

(10) Patent No.: US 12,473,398 B2
(45) Date of Patent: *Nov. 18, 2025

(54) HIGHLY HEAT-RESISTANT POLYCARBONATE ESTER AND PREPARATION METHOD THEREFOR

(71) Applicant: SK CHEMICALS CO., LTD., Seongnam-si (KR)

(72) Inventor: Kwang Sei Oh, Seoul (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 574 days.

This patent is subject to a terminal disclaimer.

(21) Appl. No.: 17/861,991

(22) Filed: Jul. 11, 2022

(65) Prior Publication Data

US 2022/0363820 A1 Nov. 17, 2022

Related U.S. Application Data

(63) Continuation of application No. 16/640,472, filed as application No. PCT/KR2018/010427 on Sep. 6, 2018, now Pat. No. 11,421,076.

(30) Foreign Application Priority Data

Sep. 28, 2017 (KR) .................. 10-2017-0125987
Aug. 27, 2018 (KR) .................. 10-2018-0100605

(51) Int. Cl.
*C08G 63/64* (2006.01)
*C08G 63/78* (2006.01)

(52) U.S. Cl.
CPC .............. *C08G 63/64* (2013.01); *C08G 63/78* (2013.01)

(58) Field of Classification Search
CPC ....... C08G 63/64; C08G 63/672; C08G 63/78
See application file for complete search history.

(56) References Cited

U.S. PATENT DOCUMENTS

| | | | |
|---|---|---|---|
| 9,963,543 B2 | 5/2018 | Oh et al. | |
| 10,479,860 B2 * | 11/2019 | Oh | C08G 63/672 |
| 10,738,150 B2 | 8/2020 | Oh et al. | |
| 11,421,076 B2 * | 8/2022 | Oh | C08G 63/64 |
| 11,479,640 B2 * | 10/2022 | Oh | C08G 63/199 |
| 11,535,705 B2 * | 12/2022 | Oh | C08G 64/305 |
| 11,590,682 B2 * | 2/2023 | Oh | B29C 48/022 |
| 11,732,089 B2 * | 8/2023 | Oh | C08G 63/672 528/298 |
| 12,162,982 B2 * | 12/2024 | Oh | C08G 63/672 |
| 2014/0285888 A1 | 9/2014 | Tanaka et al. | |
| 2015/0141577 A1 | 5/2015 | Namik et al. | |
| 2015/0247002 A1 | 9/2015 | Uehara et al. | |
| 2016/0152767 A1 | 6/2016 | Oh et al. | |
| 2020/0216609 A1 | 7/2020 | Oh | |
| 2020/0346386 A1 | 11/2020 | Oh | |

(Continued)

FOREIGN PATENT DOCUMENTS

| | | |
|---|---|---|
| CN | 106800643 A | 6/2017 |
| EP | 2 910 589 A1 | 8/2015 |

(Continued)

OTHER PUBLICATIONS

Qian Li et al "A Non-Phosgene Process to Homopolycarbonate and Copolycarbonates of Isosorbide Using Dimethyl Carbonate: Synthesis, Characterization, and Properties", Journal of Polymer Science, Part A: Polymer Chemistry 2013, 51, 1387-1397 (Year: 2013).*

(Continued)

*Primary Examiner* — Randy P Gulakowski
(74) *Attorney, Agent, or Firm* — Sughrue Mion, PLLC

(57) ABSTRACT

A heat-resistant, bio-based polycarbonate ester prepared by melt polycondensation of 1,4:3,6-dianhydrohexitol and a carbonate or 1,4-cyclohexanedicarboxylate is disclosed. The heat-resistant, bio-based polycarbonate ester includes a repeat unit 1 of Formula 1, a repeat unit 2 of Formula 2, and a repeat unit 3 of Formula 3. The polycarbonate ester has excellent heat resistance, transparency, and processability. A method of producing the polycarbonate includes a step of melt polycondensation of 1,4:3,6-dianhydrohexitol and a carbonate or 1,4-cyclohexanedicarboxylate.

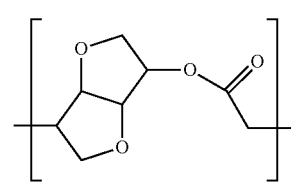

Formula 1

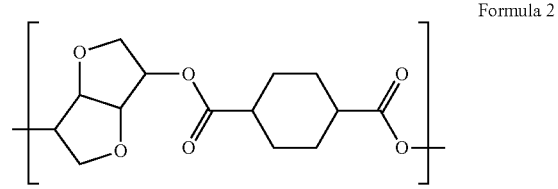

Formula 2

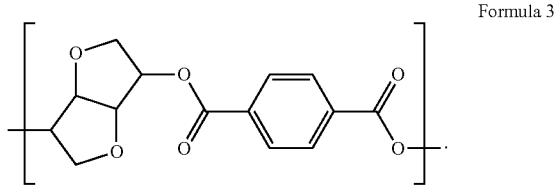

Formula 3

10 Claims, No Drawings

(56) References Cited

U.S. PATENT DOCUMENTS

2021/0301081 A1 9/2021 Oh et al.
2021/0380760 A1 12/2021 Oh

FOREIGN PATENT DOCUMENTS

| KR | 10-2015-0012152 A | 2/2015 |
| KR | 10-2016-0090703 A | 8/2016 |
| KR | 10-1736189 B1 | 5/2017 |
| WO | 2015012619 A1 | 1/2015 |

OTHER PUBLICATIONS

Long Feng et al., "A designed synthetic strategy toward poly(isosorbide terephthalate) copolymers: a combination of temporary modification, transesterification, cyclization and polycondensationt", Polymer Chemistry, 2015, pp. 7470-7479, vol. 6, No. 42.

Long Feng et al., "A high-molecular-weight and high-rg poly(ester carbonate) partially based on isosorbide: synthesis and structure-property relationships", Polymer Chemistry, 2015, pp. 633-642, vol. 6, No. 4.

International Search Report for PCT/KR2018/010427 dated Dec. 10, 2018 [PCT/ISA/210].

Written Opinion of the International Searching Authority for PCT/KR2018/010427 mailed Oct. 12, 2018—Translation (Year: 2018).

A. V. Shenoy et al "From melt flow index to rheogram", Rheol. Acta 22, 90-101 (1983) (Year: 1983).

Won Jae Yoon et al "Advanced Polymerization and Properties of Biobased High Tg polyester of Isosorbide and 1,4-Cyclohexanedicarboxylic Acid through in Situ Acetylation", Macromolecules (Year: 2013).

\* cited by examiner

HIGHLY HEAT-RESISTANT POLYCARBONATE ESTER AND PREPARATION METHOD THEREFOR

CROSS REFERENCE TO RELATED APPLICATIONS

This application is a Continuation of U.S. application Ser. No. 16/640,472 filed Feb. 20, 2020, which is a National Stage of International Application No. PCT/KR2018/010427 filed Sep. 6, 2018, claiming priority based on Korean Patent Application Nos. 10-2017-0125987 filed Sep. 28, 2017 and 10-2018-0100605 filed Aug. 27, 2018.

TECHNICAL FIELD

The present invention relates to a highly heat-resistant, bio-based polycarbonate ester and a process for preparing the same. In more detail, the polycarbonate ester is excellent in heat resistance, transparency, and processability.

BACKGROUND ART

A bio-based polycarbonate ester prepared by melt polycondensation of 1,4:3,6-dianhydrohexitol and a carbonate or an 1,4-cyclohexanedicarboxylate is a bioplastic that contains a bio-based monomer derived from a biomass, that is 1,4:3,6-dianhydrohexitol. The bio-based polycarbonate ester has high transparency of PMMA (poly(methyl methacrylate)) and high heat resistance of bisphenol A (BPA) polycarbonate.

The structural features of such bio-based polycarbonate ester lie in that it does not comprise BPA that causes environmental hormones. It is also possible to improve low ductility due to the molecular structure of 1,4:3,6-dianhydrohexitol by copolymerizing the 1,4-cyclohexanedicarboxylate monomer having an aliphatic ring molecular structure. In addition, it is possible to compensate the disadvantage of a carbonate bond by replacing some of the carbonate bonds with an ester bond.

1,4:3,6-Dianhydrohexitol has the following three stereoisomer types, which have different chemical properties depending on the relative configuration of the two hydroxyl groups: isomannide (melting point: 81-85° C.) represented by the following Formula a, isosorbide (melting point: 61-62° C.) represented by the following Formula b, and isoidide (melting point: 64° C.) represented by the following Formula c.

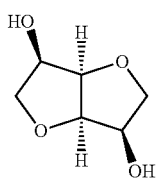

[Formula a]

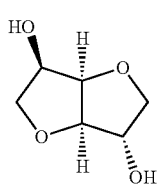

[Formula b]

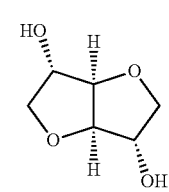

[Formula c]

In particular, in the case where 1,4:3,6-dianhydrohexitol is used as a monomer for preparing a polycarbonate, which is a representative transparent engineering plastic, the polycarbonate thus prepared has high heat resistance and transparency, as well as excellent surface hardness, UV stability, flame retardancy, and chemical resistance, attributable to the molecular structural features of 1,4:3,6-dianhydrohexitol, i.e., the stereostructure of the rigid condensed and fused heterocycles although its volume is small, along with the advantages of a bioplastic. By virtue of these advantages, 1,4:3,6-dianhydrohexitol has broadened its applicable fields as a representative raw material for developing bioplastics.

Meanwhile, 1,4-dimethyl-cyclohexanedicarboxylate (DMCD) or 1,4-cyclohexanedicarboxylic acid (CHDA), which is a hydrolysis product of DMCD, has a cyclohexane ring structure in its molecule center. Thus, in the case where it is incorporated into a polymer chain, it is possible to improve not only the UV stability and weatherability of the polymer, but also such properties of the polymer as gloss retention, yellowing resistance, hydrolytic stability, corrosion resistance, and chemical resistance owing to the unique combination of flexibility and hardness in the molecular structure. In addition, DMCD or CHDA is composed of an isomeric mixture of cis and trans forms represented by the following Formula d. DMCD commercially available has a cis/trans ratio of about 80/20%. If such an aliphatic ring structure as DMCD or CHDA is present in a polymer chain, secondary mechanical relaxation of the polymer due to the molecular flip motion of the aliphatic ring would take place to thereby improve the mechanical properties of the polymer. Especially, it has the advantage that the impact strength of the polymer is enhanced.

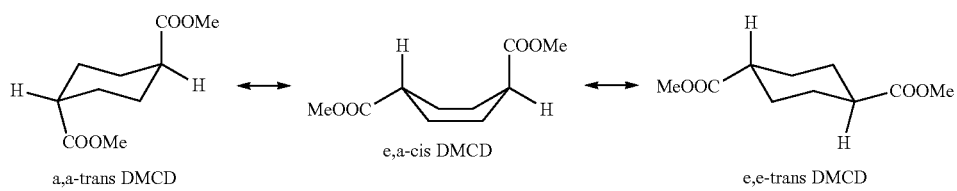

[Formula d]

Meanwhile, highly heat-resistant materials that have a glass transition temperature (Tg) of 170° C. or higher and can be applied to such various fields as automobiles, electronic devices, industrial lighting, and medical uses have been developed in recent years with an increased demand therefor. On the other hand, a bio-based polycarbonate ester prepared by melt polycondensation of 1,4:3,6-dianhydrohexitol and a carbonate or an 1,4-cyclohexanedicarboxylate has a Tg of 170° C. or lower, which requires an enhancement in the heat resistance thereof for use as a highly heat-resistant material.

For the purpose of enhancing the heat resistance of BPA polycarbonates, copolymerized polycarbonates have been developed using various monomers with bulky and rigid structures. However, the monomers having a bulky and rigid structure are expensive because it is difficult and complicated to synthesize them. In addition, it is necessary to substitute a large amount of BPA to sufficiently enhance the heat resistance, which gives rise to a problem of impairing the excellent mechanical characteristics as well as transparency and flowability of the BPA polycarbonates.

DISCLOSURE OF INVENTION

Technical Problem

Accordingly, an object of the present invention is to provide a highly heat-resistant, bio-based polycarbonate ester that is prepared from an inexpensive raw material that meets the enhancement of heat resistance and economical efficiency and is capable of maintaining high transparency of a bio-based polycarbonate ester, while materializing high flowability; and a process for preparing the same.

Solution to Problem

In order to achieve the above object, the present invention provides a highly heat-resistant, bio-based polycarbonate ester, which comprises:
a repeat unit 1 represented by the following Formula 1;
a repeat unit 2 represented by the following Formula 2; and
a repeat unit 3 represented by the following Formula 3:

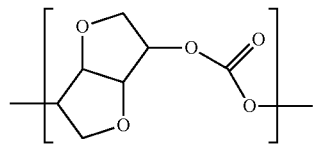

[Formula 1]

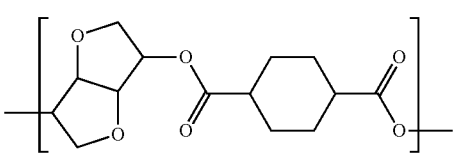

[Formula 2]

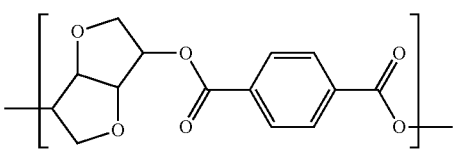

[Formula 3]

In addition, the present invention provides a process for preparing a highly heat-resistant, bio-based polycarbonate ester, which comprises:
(1) converting a compound represented by the following Formula 4 to an intermediate reactant having a halogen functional group at the terminal thereof, followed by a nucleophilic reaction with phenol or a phenol substituent, or subjecting a compound represented by the following Formula 4 to a transesterification or esterification reaction with phenol or a phenol substituent, to prepare a compound represented by the following Formula 5; and
(2) subjecting compounds represented by the following Formulae 5 to 7 and 1,4:3,6-dianhydrohexitol to a melt polycondensation reaction to prepare a compound containing repeat units 1 to 3 represented by the following Formulae 1 to 3:

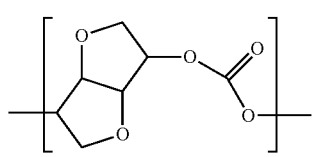

[Formula 1]

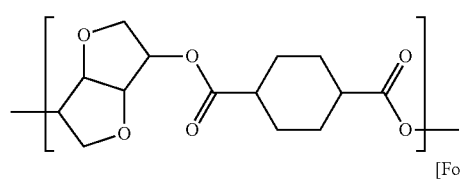

[Formula 2]

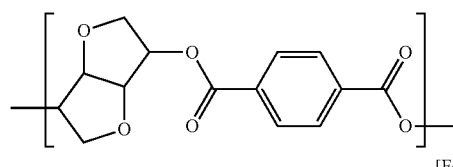

[Formula 3]

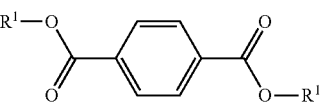

[Formula 4]

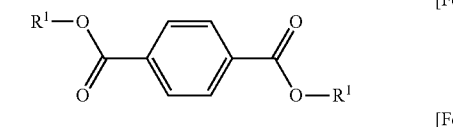

[Formula 5]

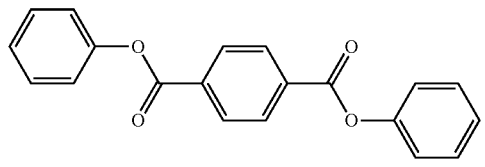

[Formula 6]

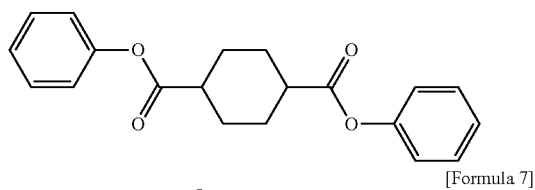

[Formula 7]

In the above formulae, $R^1$ is methyl or hydrogen, and $R^2$ and $R^3$ are each an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent.

Advantageous Effects of Invention

The highly heat-resistant, bio-based polycarbonate ester of the present invention has an excellent heat resistance as it has a glass transition temperature of 160° C. or higher, is excellent in transparency and processability, and is environmentally friendly since it is free from bisphenols.

BEST MODE FOR CARRYING OUT THE INVENTION

Hereinafter, the present invention will be described in detail.

Highly Heat-Resistant, Bio-Based Polycarbonate Ester

The present invention provides a highly heat-resistant, bio-based polycarbonate ester, which comprises a repeat unit 1 represented by the following Formula 1; a repeat unit 2 represented by the following Formula 2; and a repeat unit 3 represented by the following Formula 3:

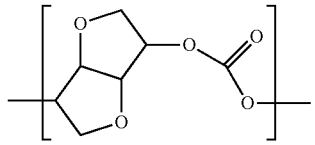
[Formula 1]

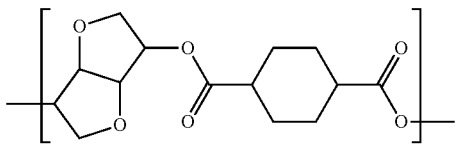
[Formula 2]

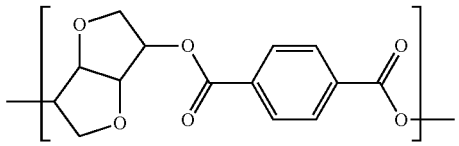
[Formula 3]

The repeat unit 1 may be obtained from the reaction of 1,4:3,6-dianhydrohexitol and a carbonate, the repeat unit 2 may be obtained from the reaction of 1,4:3,6-dianhydrohexitol and 1,4-cyclohexanedicarboxylate, and the repeat unit 3 may be obtained from the reaction of 1,4:3,6-dianhydrohexitol and a terephthalate.

The cis/trans ratio of 1,4-cyclohexanedicarboxylate in the repeat unit 2 may be 1/99 to 99/1%, 20/80 to 80/20%, or 30/70 to 70/30%.

1,4:3,6-dianhydrohexitol may be isomannide, isosorbide, or isoidide. Specifically, it may be isosorbide.

Specifically, the highly heat-resistant, bio-based polycarbonate ester is composed of the repeat units 1 to 3. When the molar fractions of the repeat units 1 to 3 are x, y, and z, respectively, x is a real number of greater than 0 to less than 1, y is a real number of greater than 0 to 0.7, z is a real number of greater than 0 to 0.6, and x+y+z may be 1. More specifically, x is a real number of greater than 0 to 0.9 or greater than 0 to 0.8, y is a real number of greater than 0 to 0.6 or greater than 0 to 0.5, z is a real number of greater than 0 to 0.5 or greater than 0 to 0.4, and x+y+z may be 1.

The highly heat-resistant, bio-based polycarbonate ester may have a glass transition temperature (Tg) of 160 to 240° C. and a melt flow index (MFI) of 5 to 150 g/10 min when measured at 260° C. under a load of 2.16 kg. Specifically, the highly heat-resistant, bio-based polycarbonate ester may have a Tg of 170 to 220° C. or 180 to 200° C. and a melt flow index (MFI) of 10 to 100 g/10 min or 15 to 50 g/10 min when measured at 260° C. under a load of 2.16 kg.

The highly heat-resistant, bio-based polycarbonate ester may have an intrinsic viscosity (IV) of 0.3 to 2.3 dL/g.

Process for Preparing a Highly Heat-Resistant, Bio-Based Polycarbonate Ester

In addition, the present invention provides a process for preparing a highly heat-resistant, bio-based polycarbonate ester, which comprises:

(1) converting a compound represented by the following Formula 4 to an intermediate reactant having a halogen functional group at the terminal thereof, followed by a nucleophilic reaction with phenol or a phenol substituent, or subjecting a compound represented by the following Formula 4 to a transesterification or esterification reaction with phenol or a phenol substituent, to prepare a compound represented by the following Formula 5; and (2) subjecting compounds represented by the following Formulae 5 to 7 and 1,4:3,6-dianhydrohexitol to a melt polycondensation reaction to prepare a compound containing repeat units 1 to 3 represented by the following Formulae 1 to 3:

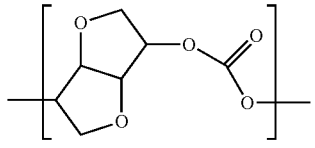
[Formula 1]

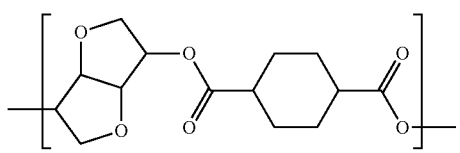
[Formula 2]

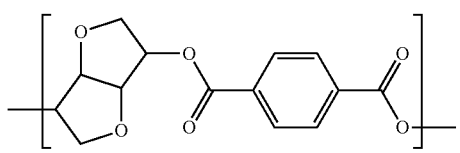
[Formula 3]

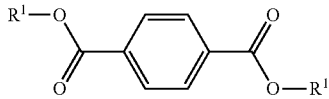
[Formula 4]

[Formula 5]

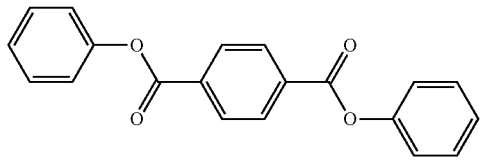

[Formula 6]

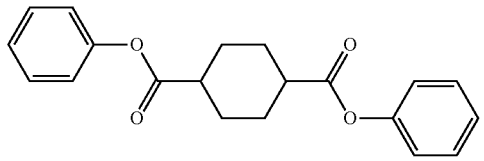

[Formula 7]

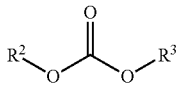

In the above formulae, $R^1$ is methyl or hydrogen, and $R^2$ and $R^3$ are each an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent. Here, the ester substituent may be an alkyl ester having 1 to 18 carbon atoms, a cycloalkyl ester having 4 to 20 carbon atoms, or an aryl ester having 6 to 18 carbon atoms.

Step (1)

In this step, a compound represented by the above Formula 4 is converted to an intermediate reactant having a halogen functional group at the terminal thereof, followed by a nucleophilic reaction with phenol or a phenol substituent, or a compound represented by the above Formula 4 is subjected to a transesterification or esterification reaction with phenol or a phenol substituent, to prepare a compound represented by the above Formula 5.

The phenol substituent may be a compound represented by the following Formula 9.

[Formula 9]

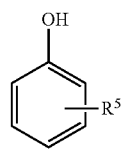

In the above Formula 9, $R^5$ is an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, or an ester substituent. Here, the ester substituent may be an alkyl ester having 1 to 18 carbon atoms, a cycloalkyl ester having 4 to 20 carbon atoms, or an aryl ester having 6 to 18 carbon atoms.

Intermediate Reactant

The intermediate reactant having a halogen functional group at the terminal thereof may be a compound represented by the following Formula 8.

[Formula 8]

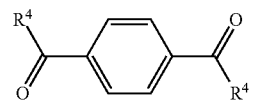

In the above Formula 8, $R^4$ is each independently F, Cl, or Br.

Specifically, the intermediate reactant having a halogen functional group at the terminal thereof may be terephthaloyl chloride (TPC) in which $R^4$ is Cl.

In addition, the intermediate reactant having a halogen functional group at the terminal thereof may be prepared by reacting the compound represented by the above Formula 4 (a dicarboxylate or a dicarboxylic acid) with a halogenated compound.

The halogenated compound may be at least one selected from the group consisting of phosgene, triphosgene, thionyl chloride, oxalyl chloride, phosphorus trichloride, phosphorus pentachloride, phosphorus pentabromide, and cyanuric fluoride. Specifically, the halogenated compound may be at least one chlorinating agent selected from the group consisting of phosgene, thionyl chloride, and oxalyl chloride, from which reaction by-products can be readily removed. In addition, the halogenated compound may be preferably phosgene from a commercial viewpoint.

The amount of the halogenated compound to be added may be 1 to 10 times, 1.5 to 7.5 times, or 2 to 5 times the molar amount of the compound of the above Formula 4 initially employed.

The reaction conditions and time in the conversion to the intermediate reactant may vary depending on the type of the compound of the above Formula 4 and the halogenated compound. Specifically, the conversion to the intermediate reactant may be carried out under atmospheric pressure at a temperature of −30 to 150° C. for 5 minutes to 48 hours. More specifically, the conversion to the intermediate reactant may be carried out under atmospheric pressure at a temperature of 20 to 100° C. or 40 to 80° C. for 10 minutes to 24 hours.

In the conversion to the intermediate reactant, an organic solvent may be used to dissolve or disperse the compound of the above Formula 4. In such event, the organic solvent that may be used may be, for example, benzene, toluene, xylene, mesitylene, methylene chloride, dichloroethane, chloroform, carbon tetrachloride, monochlorobenzene, o-dichlorobenzene, tetrahydrofuran, dioxane, acetonitrile, or the like.

In order to increase the conversion rate and the reaction yield of the intermediate reactant, a catalyst may be used depending on the kind of the compound of the above Formula 4 and the halogenated compound used in the conversion to the intermediate reactant. The type of the catalyst is not particularly limited as long as it meets this object. An organic catalyst that may be used includes dimethylformamide, dimethylacetamide, methylpyrrolidone, dimethyl imidazolidinone, tetramethylurea, tetraethylurea, and tetrabutylurea. An inorganic catalyst may include aluminum chloride (AlCl₃), iron chloride (FeCl₃), bismuth chloride (BiCl₃), gallium chloride (GaCl₃), antimony pentachloride (SbCl₅), boron trifluoride (BF₃), bismuth trifluoromethanesulfonate (Bi(OTf)₃), titanium tetrachloride (TiCl₄), zirconium tetrachloride (ZrCl₃), titanium tetrabromide (TiBr₄), and zirconium tetrabromide (ZrBr₄). Among these, dimethylformamide, tetramethylurea, or dimethyl imidazolidinone may be used as the organic catalyst, and aluminum chloride or titanium tetrachloride may be used as the inorganic catalyst. In addition, dimethylformamide may be used as the commercially preferable organic catalyst, and aluminum chloride may be used as the commercially preferable inorganic catalyst.

The amount of the catalyst to be used in the conversion to the intermediate reactant is not particularly limited, but varies depending on the kind of the compound of the above Formula 4 and the halogenated compound. Specifically, the amount of the catalyst used in the conversion to the intermediate reactant may be in the range of greater than 0 to 10% by mole, greater than 0 to 5% by mole, or greater than 0 to 3% by mole, based on the total molar amount of the compound of the above Formula 4 initially employed. If the amount of the catalyst used in the conversion to the intermediate reactant is within the above range, it is possible to prevent the problems that the reaction rate is reduced and a runaway reaction and an exothermic reaction are induced.

In the above step (1), terephthalic acid (TPA) in the case where $R^1$ is hydrogen in the above Formula 4 or dimethyl terephthalate (DMT) in the case where $R^1$ is methyl in the above Formula 4 is converted to TPC as an intermediate reactant having a halogen functional group at the terminal thereof, followed by a reaction with phenol or a phenol substituent, to prepare diphenyl terephthalate (DPT) represented by the above Formula 5 (see Reaction Scheme 1 below, wherein Me is methyl, and Ph is a phenyl group).

[Reaction Scheme 1]

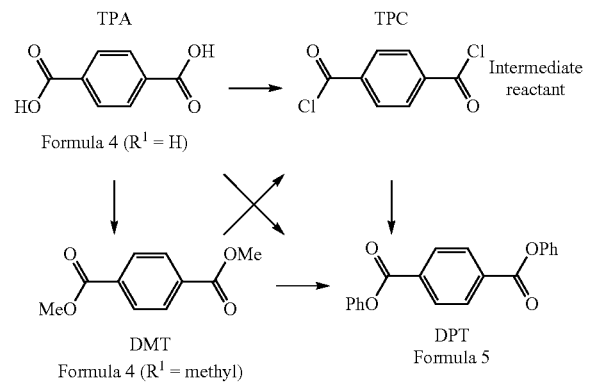

The molar ratio of the compound represented by the above Formula 8 to phenol or the phenol substituent in the above nucleophilic reaction may be 1:1 to 5. Specifically, the molar ratio of the compound represented by the above Formula 8 to phenol or the phenol substituent in the above nucleophilic reaction may be 1:2 to 3. If the molar ratio of the compound represented by the above Formula 8 to phenol or the phenol substituent in the above nucleophilic reaction is within the above range, it is possible to prevent the problem that the final yield of the compound (DPT) represented by the above Formula 5 is reduced, which may be caused by the use of an excessive amount of phenol or the phenol substituent.

Transesterification or Esterification Reaction

In addition, in the above step (1), TPA in the case where $R^1$ is hydrogen in the above Formula 4 or DMT in the case where $R^1$ is methyl in the above Formula 4 is subjected to a transesterification or esterification reaction with phenol or a phenol substituent to prepare a compound represented by the above Formula 5 (see Reaction Scheme 1 above).

The transesterification or esterification reaction may be carried out at 20 to 300° C. Specifically, the transesterification or esterification reaction may be carried out under atmospheric pressure at 50 to 250° C. or 100 to 200° C. or under a pressure of 0.1 to 10 kgf/cm² or 1 to 5 kgf/cm² at 50 to 300° C.

The transesterification or esterification reaction may be carried out for 5 minutes to 48 hours or 10 minutes to 24 hours.

In the transesterification or esterification reaction, the molar ratio of the compound represented by the above Formula 4 to phenol or the phenol substituent may be 1:2 to 40. Specifically, in the transesterification or esterification reaction, the molar ratio of the compound represented by the above Formula 4 to phenol or the phenol substituent may be 1:3 to 30 or 1:4 to 20. If the molar ratio of the compound represented by the above Formula 4 to phenol or the phenol substituent is within the above range, it is possible to prevent the problem that the final yield of the compound represented by the above Formula 5 is reduced, which may be caused by the use of a small amount of phenol or the phenol substituent.

Step (2)

In this step, compounds represented by the following Formulae 5 to 7 and 1,4:3,6-dianhydrohexitol is subjected to a melt polycondensation reaction to prepare a compound containing repeat units 1 to 3 represented by the following Formulae 1 to 3.

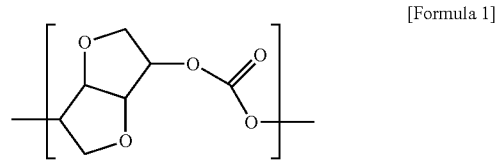

[Formula 1]

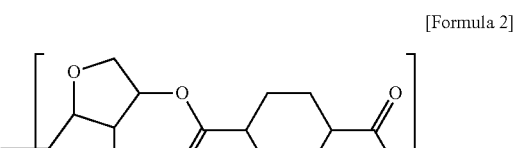

[Formula 2]

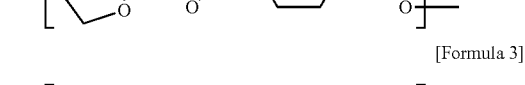

[Formula 3]

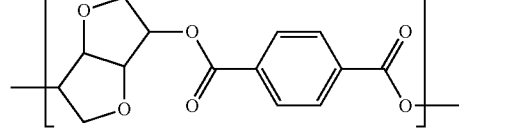

[Formula 4]

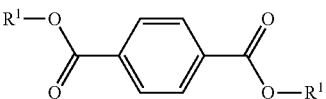

[Formula 5]

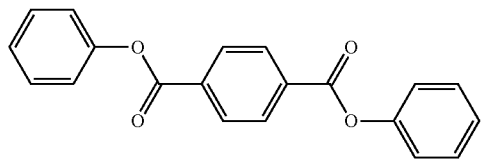

[Formula 6]

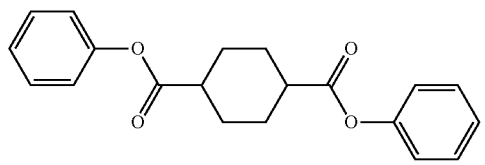

[Formula 7]

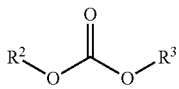

In the above formulae, $R^2$ and $R^3$ are each an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent. Here, the ester substituent may be an alkyl ester having 1 to 18 carbon atoms, a cycloalkyl ester having 4 to 20 carbon atoms, or an aryl ester having 6 to 18 carbon atoms.

The cis/trans ratio of the compound represented by the above Formula 6 may be 1/99 to 99/1%, 10/90 to 90/10%, or 20/80 to 80/20%. In addition, the cis/trans ratio of 1,4-cyclohexanedicarboxylate in the repeat unit 2 may be 1/99 to 99/1%, 20/80 to 80/20%, or 30/70 to 70/30%.

The compound represented by the above Formula 7 may be dimethyl carbonate, diethyl carbonate, di-t-butyl carbonate, diphenyl carbonate, ditolyl carbonate, or bis(methyl salicyl) carbonate.

Specifically, since the above melt polycondensation reaction is carried out under reduced pressures, diphenyl carbonate or substituted diphenyl carbonate may be used as the compound represented by the above Formula 7. The substituted diphenyl carbonate may be ditolyl carbonate or bis (methyl salicyl) carbonate.

1,4:3,6-dianhydrohexitol 1,4:3,6-dianhydrohexitol may be isomannide, isosorbide, or isoidide. Specifically, it may be isosorbide.

Meanwhile, it is very important to maintain a high purity of 1,4:3,6-dianhydrohexitol used in the melt polycondensation in order to enhance the heat resistance, transparency, and mechanical properties of the highly heat-resistance, bio-based polycarbonate ester thus prepared. 1,4:3,6-dianhydrohexitol may be in the form of powder, flake, or an aqueous solution. If 1,4:3,6-dianhydrohexitol is exposed to air for a long period of time, however, it may be readily oxidized and discolored, which may give rise to a problem that the color and molecular weight of the final polymer would not be satisfactory. Thus, it is necessary to minimize the exposure of 1,4:3,6-dianhydrohexitol to air. Once 1,4:3, 6-dianhydrohexitol is exposed to air, it is preferably stored with a deoxidizing agent such as an oxygen absorber. In addition, it is very important to purify 1,4:3,6-dianhydrohexitol by removing the impurities contained therein, which have been produced in the multi-step process of preparing 1,4:3,6-dianhydrohexitol, in order to maintain the purity thereof. Specifically, in the purification of 1,4:3,6-dianhydrohexitol by distillation, it is crucial to remove a trace level of acidic liquid components that can be removed by an initial separation and alkali metal components that can be removed by a residue separation. Each of the acidic liquid components and alkali metal components may be kept at a level of 10 ppm or lower, 5 ppm or lower, or 3 ppm or lower.

Highly Heat-Resistance, Bio-Based Polycarbonate Ester

The highly heat-resistance, bio-based polycarbonate ester may be composed of the above repeat units 1 to 3. Specifically, 1,4:3,6-dianhydrohexitol and the compound represented by the above Formula 7 may react to form a carbonate bond (repeat unit 1, Formula 1), 1,4:3,6-dianhydroxyhexitol and the compound represented by the above Formula 6 may react to form an ester bond (repeat unit 2, Formula 2), and 1,4:3,6-dianhydrohexitol and the compound represented by the above Formula 5 may react to form an ester bond (repeat unit 3, Formula 3).

In such event, when the molar fraction of 1,4:3,6-dianhydrohexitol is 1, the molar fraction of the compound represented by the above Formula 7 is x, the molar fraction of the compound represented by the above Formula 6 (1,4-diphenyl-cyclohexanedicarboxylate, DPCD) is y, and the molar fraction of the compound represented by the above Formula 5 (DPT) is z, x+y+z=1 (see the following Reaction Scheme 2, wherein Ph is phenyl group).

[Reaction Scheme 2]

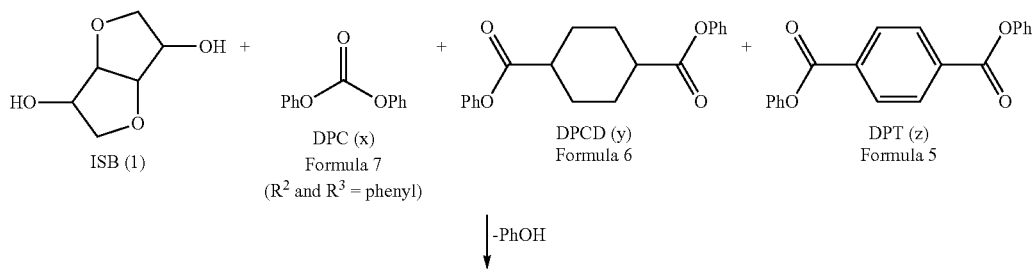

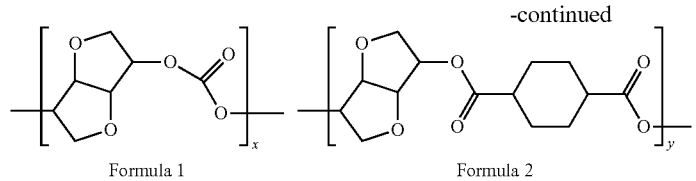
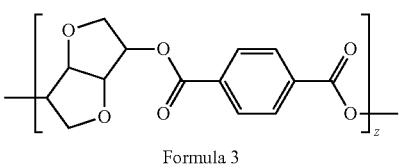

Formula 1    Formula 2    Formula 3

Specifically, when the amount of the compounds represented by the above Formulae 5 and 6 is 0, a polycarbonate prepared by the melt polycondensation of 1,4:3,6-dianhydrohexitol and diphenyl carbonate (Formula 7) has a Tg of 163° C. Here, if the amount of the compounds represented by the above Formulae 5 and 6 increases, an ester bond in the polymer chain increases. When the amount of the compound represented by the above Formula 5 is 1, a polyester having a Tg of 215° C. is prepared. When the amount of the compound represented by the above Formula 6 is 1, a polyester having a Tg of 132° C. is prepared.

Hence, the content of the repeat units 2 and 3 represented by the above Formulae 2 and 3 and the number of carbonate and ester bonds contained in the polymer chain depend on the amount of the compounds represented by the above Formulae 5 and 6. In the case where the polymer chain contains carbonate and ester bonds together (inclusive of the repeat units 1 to 3), it is possible to materialize properties suitable for various applications. In particular, a polymer that is excellent in heat resistance, transparency, and processability as targeted in the present invention can be provided.

The total amount of the compound represented by the above Formula 5, the compound represented by the above Formula 6, and the compound represented by the above Formula 7 may be 0.7 to 1.3 mol %, 0.9 to 1.1 mol %, or 0.95 to 1.05 mol %, respectively, based on 1 mol % of 1,4:3,6-dianhydrohexitol.

In general, a polycarbonate is excellent in heat resistance and mechanical properties, but is poor in chemical resistance, residual stress, and molding cycle time, as compared with a polyester. As described above, however, a polycarbonate ester containing carbonate and ester bonds together in the single polymer chain thereof would have the advantages of a polycarbonate and a polyester while the disadvantages thereof are compensated.

Melt Polycondensation Reaction

The melt polycondensation reaction may be carried out by elevating temperature and reducing pressure in a stepwise manner in order to rapidly remove by-products from the molten reactants having a high viscosity and to promote the polymerization reaction.

Specifically, the melt polycondensation reaction in the above step (2) may comprise:

(2-1) a first reaction step under a reduced pressure of 50 to 700 torr at a temperature of 130 to 250° C., 140 to 240° C., or 150 to 230° C., for 0.1 to 10 hours or 0.5 to 5 hours; and (2-2) a second reaction step under a reduced pressure of 0.1 to 20 torr at a temperature of 200 to 350° C., 220 to 280° C., or 230 to 270° C., for 0.1 to 10 hours or 0.5 to 5 hours.

Specifically, the melt polycondensation reaction may comprise:

(2-1) a first reaction step with elevating temperature to 130 to 200° C., followed by reducing pressure to 200 to 700 torr, and elevating temperature to 200 to 250° C. at a rate of 0.1 to 10° C./min, followed by reducing pressure to 50 to 180 torr; and (2-2) a second reaction step with reducing pressure to 1 to 20 torr, followed by elevating temperature to 200 to 350° C. at a rate of 0.1 to 5° C./min, and reducing pressure to 0.1 to 1 torr.

Meanwhile, phenol may be produced as a reaction by-product during the melt polycondensation reaction. It is preferable that phenol produced as a by-product is removed from the reaction system in order to shift the reaction equilibrium towards the production of the polycarbonate ester. If the rate of temperature elevation in the melt polycondensation reaction is within the above ranges, it is possible to prevent the problem that phenol, a reaction by-product, evaporates or sublimes together with the reaction raw materials. Specifically, the polycarbonate ester may be prepared in a batch or continuous process.

In particular, in order to produce a polymer of high transparency, relatively low reaction temperatures are suitable for the melt polycondensation reaction that uses 1,4:3,6-dianhydrohexitol. In addition, in order to secure the mechanical properties of the polymer thus prepared, it is preferable that the melt polycondensation reaction is carried out to a high degree of polymerization. For this purpose, it is effective to use a high viscosity polymerization reactor for the melt polycondensation reaction. The target viscosity in the melt polycondensation reaction may be 10,000 to 1,000,000 poises, 20,000 to 500,000 poises, or 50,000 to 200,000 poises.

Additional Diol Compound

The reactants (i.e., the compounds represented by the above Formulae 5 to 7 and 1,4:3,6-dianhydrohexitol) in the above step (2) may comprise an additional diol compound other than 1,4:3,6-dianhydrohexitol, the additional diol compound being not particularly limited. The additional diol compound may be a primary, secondary, or tertiary diol compound depending on the target properties of the polymer.

When the molar ratio of the additional diol compound employed is q, the molar ratio of 1,4:3,6-dianhydrohexitol employed is to be 1-q. In particular, if the additional diol compound is a petrochemical-based diol compound, it may be used such that the bio-based carbon content (ASTM-D6866) in the final polymer derived from 1,4:3,6-dianhydrohexitol is at least 1 mol %. In such event, q may satisfy 0≤q<0.99. That is, the additional diol compound may be used in an amount of less than 99 mol % based on 100 mol % of 1,4:3,6-dianhydrohexitol.

Here, the additional diol compound may be a diol compound having a single aliphatic ring or a condensed heterogeneous ring at the center of the molecule in order to enhance the heat resistance, transparency, UV stability, and weatherability of the highly heat-resistance, bio-based polycarbonate ester thus prepared. Meanwhile, when the hydroxyl groups are in a symmetrical structure, the ring size and heat resistance proportionally increase. On the other hand, the optical characteristics do not depend on the ring size and the positions of the hydroxyl groups, but they vary with the characteristics of each raw material. As the ring size is bigger, it is more difficult to commercially produce and utilize the diol compound. Specifically, the additional diol compound may be at least one selected from the group consisting of 1,2-cyclohexanedimethanol, 1,3-cyclohexanedimethanol, 1,4-cyclohexanedimethanol, tricyclodecane dimethanol, pentacyclopentadecanedimethanol, decalindimethanol, tricyclotetradecanedimethanol, norbornanedimethanol, adamantanedimethanol, 3,9-bis(1,1-dimethyl-2-hydroxyethy l)-2,4,8,10-tetraoxaspiro[5,5]undecane, bicyclo[2.2.2]octane-2,3-dimethanol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbornanediol, adamantanediol, 2,2-bis(4-hydroxycyclohexyl)propane, 2,2,4,4-tetramethyl-1,3-cyclobutanediol and 5,5'-(1-methylethylidene)bis(2-furanmethanol), tetrahydrofuran-2,5-dimethanol, 2,4:3,5-di-o-methylene-D-mannitol derivable from a bio-based material. Specifically, the additional diol compound may be 1,4-cyclohexanedimethanol, 2,2-bis(4-hydroxycyclohexyl)propane, 2,2,4,4-tetramethyl-1,3-cyclobutanediol or tetrahydrofuran-2,5-dimethanol.

Additional Diphenyl Ester Compound

Meanwhile, the reactants (i.e., the compounds represented by the above Formulae 5 to 7 and 1,4:3,6-dianhydrohexitol) in the step (2) may comprise an additional diphenyl ester compound other than the compounds represented by the above Formulae 5 and 6, which are monomers for ester bonds in the polymer chain, depending on the target properties of the polymer. When the molar ratio of the additional diphenyl ester compound employed is p, the molar ratio of the compounds represented by the above Formulae 5 to 7 employed is to be 1-p. In such event, p may satisfy 0≤p<1.

The additional diphenyl ester compound may be one kind or a mixture of two or more kinds.

The additional diphenyl ester may be prepared by reacting a primary, secondary, or tertiary dicarboxylate or dicarboxylic acid (hereinafter referred to as an additional dicarboxylate or dicarboxylic acid) with phenol or a phenol substituent. The additional diphenyl ester may be prepared by reacting an additional dicarboxylate or dicarboxylic acid having a single aliphatic ring or a condensed heterogeneous ring at the center of the molecule with phenol or a phenol substituent in order to enhance the heat resistance, transparency, UV stability, and weatherability of the highly heat-resistance, bio-based polycarbonate ester thus prepared.

The additional dicarboxylate compound may be at least one selected from the group consisting of 1,2-dimethyl-cyclohexanedicarboxylate, 1,3-dimethyl-cyclohexanedicarboxylate, dimethyl decahydro-2,4-naphthalenedicarboxylate, dimethyl decahydro-2,5-naphthalenedicarboxylate, dimethyl decahydro-2,6-naphthalenedicarboxylate, dimethyl decahydro-2,7-naphthalenedicarboxylate, and dimethyl tetrahydrofuran-2,5-dicarboxylate.

The additional dicarboxylic acid compound may be at least one selected from the group consisting of 1,2-cyclohexanedicarboxylic acid, 1,3-cyclohexanedicarboxylic acid, decahydro-2,4-naphthalenedicarboxylic acid, decahydro-2,5-naphthalenedicarboxylic acid, decahydro-2,6-naphthalenedicarboxylic acid, decahydro-2,7-naphthalenedicarboxylic acid, and tetrahydrofuran-2,5-dicarboxylic acid Specifically, the additional diphenyl ester may be prepared from dimethyl tetrahydrofurane-2,5-dicarboxylate, tetrahydrofuran-2,5-dicarboxylic acid, dimethyl decahydro-2,6-naphthalene dicarboxylate or decahydro-2,6-naphthalenedicarboxylic acid, derivable from a bio-based material.

Catalyst for the Melt Polycondensation Reaction

In the above melt polycondensation reaction, a catalyst may be used for enhancing the reactivity of the reaction. The catalyst may be added to the reaction step at any time, but it is preferably added before the reaction.

Any alkali metal and/or alkali earth metal catalyst commonly used in a polycarbonate melt polycondensation reaction may be used as the catalyst. The catalyst may be used in combination with a basic ammonium or amine, a basic phosphorous, or a basic boron compound. Alternatively, it may be used alone. Examples of the alkali metal catalysts may include lithium hydroxide (LiOH), sodium hydroxide (NaOH), potassium hydroxide (KOH), cesium hydroxide (CsOH), lithium carbonate ($Li_2CO_3$), sodium carbonate ($Na_2CO_3$), potassium carbonate ($K_2CO_3$), cesium carbonate ($Cs_2CO_3$), lithium acetate (LiOAc), sodium acetate (NaOAc), potassium acetate (KOAc), cesium acetate (CsOAc), and the like. In addition, examples of the alkali earth metal catalysts may include calcium hydroxide (Ca$(OH)_2$), barium hydroxide (Ba$(OH)_2$), magnesium hydroxide (Mg$(OH)_2$), strontium hydroxide (Sr$(OH)_2$), calcium carbonate ($CaCO_3$), barium carbonate ($BaCO_3$), magnesium carbonate ($MgCO_3$), strontium carbonate ($SrCO_3$), calcium acetate (Ca$(OAc)_2$), barium acetate (Ba$(OAc)_2$), magnesium acetate (Mg$(OAc)_2$), strontium acetate (Sr$(OAc)_2$), and the like. Further, an oxide, hydride, amide, or phenolate of an alkali metal and/or an alkaline earth metal may be used as the catalyst. Examples thereof may include magnesium oxide (MgO), barium oxide (BaO), sodium aluminate ($NaAlO_2$), and the like. In addition, zinc oxide (ZnO), lead oxide (PbO), dibutyltin oxide (($C_4H_9)_2$SnO), antimony trioxide ($Sb_2O_3$) may be used as the catalyst.

The catalyst in the melt polycondensation reaction may be used in an amount such that the metal equivalent of the catalyst is greater than 0 to 5 mmol, greater than 0 to 3 mmol, or greater than 0 to 1 mmol, based on 1 mole of the entire diol compounds. If the amount of the catalyst is within the above range, it is possible to prevent the problems that the degree of polymerization falls below the target degree of polymerization and that a side reaction takes place whereby such target physical properties as transparency are impaired.

In addition, in the process for preparing a highly heat-resistant, bio-based polycarbonate ester of the present invention, various additives may be added to the reactants, if necessary. For example, the additives may include an antioxidant or a thermal stabilizer such as hindered phenol, hydroquinone, phosphite, and a substituted compound thereof; a UV absorber such as resorcinol, salicylate, and the like; a color protecting agent such as phosphite, hydrophosphite, and the like; and a lubricant such as montanic acid, stearyl alcohol, and the like. Further, a dye and a pigment may be used as a colorant; carbon black may be used as a conductive agent, a colorant, or a nucleation agent; and a flame retardant, a plasticizer, an antistatic agent, and the like may be used. The aforementioned additives may be used in an amount that does not adversely affect the properties, especially transparency, of the final polymer.

MODE FOR THE INVENTION

Hereinafter, the present invention is described in more detail by following examples. However, these examples are provided only for illustration purposes, and the present invention is not limited thereto.

EXAMPLE

Preparation Example 1: Preparation of DPT from TPA

A 1-L round-bottom flask equipped with a 4-blade agitator, inlets for phosgene and nitrogen gas, an outlet for gases, and a thermometer was charged with 100 g (0.60 mol) of TPA (SK Chemicals) and 200 g of toluene. The mixture was stirred at room temperature. 1.28 mol of phosgene gas was fed to the flask under atmospheric pressure for 10 hours to carry out the reaction. Thereafter, nitrogen gas was fed to the flask for 2 hours to remove the residual phosgene and hydrochloric acid gas generated as a by-product, thereby yielding a transparent and homogeneous reaction solution. An analysis of the reaction solution by gas chromatography (GC) indicated that the ratio of TPC was 49 wt % and that the reaction yield was 87%.

Then, 50 wt % of toluene initially supplied was distilled off from the reaction solution under a reduced pressure. Thereafter, a phenol solution in which 121 g (1.28 mol) of phenol was dissolved in 121 g of toluene was added through a dropping funnel to the reaction solution for 2 hours. The mixture was stirred for 1 hour. Upon completion of the reaction, toluene was distilled off from the reaction solution under a reduced pressure. The crude DPT thus obtained was purified by recrystallization. Then, the purified DPT was dried at 90° C. under vacuum for 24 hours to obtain 162 g of DPT. Here, the reaction yield was 85%, and the purity of DPT according to a GC analysis was 99.8%.

Preparation Example 2: Preparation of DPT from TPA

The procedures of Preparation Example 1 were repeated to prepare DPT, except that 1.27 g (0.017 mol) of dimethyl formamide was employed as an organic catalyst. As a result of synthesis, the reaction yield was 84%, and the purity of DPT according to a GC analysis was 99.7%.

Preparation Example 3: Preparation of DPT from DMT

A 1-L round-bottom flask equipped with a 4-blade agitator, inlets for phosgene and nitrogen gas, an outlet for gases, and a thermometer was charged with 100 g (0.51 mol) of DMT (SK Chemicals), 2.0 g (0.015 mol) of aluminum chloride, and 200 g of toluene. The mixture was stirred at room temperature. 1.10 mol of phosgene gas was fed to the flask under atmospheric pressure for 10 hours to carry out the reaction. Thereafter, nitrogen gas was fed to the flask for 2 hours to remove the residual phosgene and hydrochloric acid gas generated as a by-product, thereby yielding a transparent and homogeneous reaction solution. An analysis of the reaction solution by gas chromatography (GC) indicated that the ratio of TPC was 48 wt % and that the reaction yield was 89%.

Then, 50 wt % of toluene initially supplied was distilled off from the reaction solution under a reduced pressure. Thereafter, a phenol solution in which 100 g (1.06 mol) of phenol was dissolved in 100 g of toluene was added through a dropping funnel to the reaction solution for 2 hours. The mixture was stirred for 1 hour. Upon completion of the reaction, toluene was distilled off from the reaction solution under a reduced pressure. The crude DPT thus obtained was purified by recrystallization. Then, the purified DPT was dried at 90° C. under vacuum for 24 hours to obtain 85 g of DPT. Here, the reaction yield of DPT was 87%, and the purity of DPT according to a GC analysis was 99.7%.

Preparation Example 4: Preparation of DPT from TPA

A 1-L autoclave equipped with a 4-blade agitator, a cooling condenser, and a thermometer was charged with 100 g (0.6 mol) of TPA, 565 g (6 mol) of phenol, and 1.83 g (0.01 mol) of zinc acetate ($Zn(OAc)_2$) as a catalyst. Then, the mixture was heated to 100° C. and stirred, followed by pressurizing to 1 kgf/cm$^2$ and elevating temperature to carry out the reaction at 200° C. for 10 hours. In such event, water generated as a reaction by-product was discharged from the autoclave. Upon completion of the reaction, excessively added phenol was distilled off under a reduced pressure to thereby finally obtain a solid product containing unreacted materials.

Then, 136 g of the solid product containing unreacted materials, 282 g of phenol, 400 g of toluene, and 0.92 g of zinc acetate were charged to the autoclave as described above and then stirred at room temperature. Thereafter, the mixture was heated to 100° C. and subjected to the reaction at room temperature for 10 hours. In such event, water generated as a reaction by-product was discharged from the autoclave. Upon completion of the reaction, the reactants were cooled to 50° C. and separated by solid-liquid separation using a filter. Then, toluene was removed from the separated toluene solution using an evaporator, and the crude DPT thus obtained was purified by recrystallization. Thereafter, the purified DPT was dried at 90° C. under vacuum for 24 hours to obtain 80 g of DPT. Here, the reaction yield was 42%.

Preparation Example 5: Preparation of DPT from DMT

A 1-L autoclave equipped with a 4-blade agitator, a cooling condenser, and a thermometer was charged with 100 g (0.51 mol) of DMT (SK Chemicals), 480 g (5.10 mol) of phenol, and 1.72 g (0.01 mol) of p-toluenesulfonic acid. Then, the mixture was heated to 100° C. and stirred, followed by pressurizing to 1 kgf/cm$^2$ and elevating temperature to carry out the reaction at 200° C. for 10 hours. In such event, methanol generated as a reaction by-product was discharged from the autoclave. Upon completion of the reaction, excessively added phenol was distilled off under a reduced pressure to thereby finally obtain a solid product containing unreacted materials.

Then, 140 g of the solid product containing unreacted materials, 240 g of phenol, 400 g of toluene, and 0.86 g of p-toluenesulfonic acid were charged to the autoclave as described above and then stirred at room temperature. Thereafter, the mixture was heated to 100° C. and subjected to the reaction at room temperature for 10 hours. In such event, methanol generated as a reaction by-product was discharged from the autoclave. Upon completion of the reaction, the reactants were cooled to room temperature and separated by solid-liquid separation using a filter. Then, toluene was removed from the separated toluene solution using an evaporator, and the crude DPT thus obtained was purified by recrystallization. Thereafter, the purified DPT was dried at 90° C. under vacuum for 24 hours to obtain 106 g of DPT. Here, the reaction yield was 65%.

Example 1: Preparation of a Highly Heat-Resistant, Bio-Based Polycarbonate Ester An 18-L bench-scale reactor for polycondensation was charged with 1,995 g (13.7 mol) of isosorbide (ISB, Roquette Freres), 436 g (1.37 mol) of DPT prepared in Preparation Example 1, 444 g (1.37 mol) of DPCD (SK Chemicals), 2,345 g (10.96 mol) of DPC (Changfeng), and 2 g of a 1% aqueous solution of sodium aluminate (NaAlO$_2$). The mixture was heated to 150° C. Once the temperature reached 150° C., the pressure was reduced to 400 torr, and the temperature was then elevated to 190° C. over 1 hour. During the temperature elevation, phenol was generated as a by-product of the polymerization reaction. When the temperature reached 190° C., the pressure was reduced to 100 torr and maintained for 20 minutes, and then the temperature was elevated to 230° C. over 20 minutes. Once the temperature reached 230° C., the pressure was reduced to 10 torr, and then the temperature was elevated to 250° C. over 10 minutes. The pressure was reduced to 1 torr or less at 250° C., and the reaction continued until the target stirring torque was reached. Upon arrival at the target stirring torque, the reaction was terminated. The polymerized product was discharged as a strand under a pressure, which was rapidly cooled in a water bath and then cut into pellets. The polycarbonate ester thus prepared had Tg of 168° C. and IV of 0.54 dL/g.

Example 2 to 10: Preparation of a Highly Heat-Resistant, Bio-Based Polycarbonate Ester The same procedures as Example 1 were repeated, except that the raw materials for polymers were as described in Table 1 below.

Comparative Example 1: Preparation of a Bio-Based Polycarbonate Ester from CHDM

The same procedures as Example 1 were repeated to prepare a polycarbonate ester, except that 1,623 g (5.1 mol) of DPT prepared in Preparation Example 1, 2,549 g (11.9 mol) of DPC, 1,988 g (13.6 mol) of ISB, and 490 g (3.4 mol) of 1,4-cyclohexanedimethanol (CHDM, SK Chemicals) were used while DPCD was not used. The polycarbonate ester thus prepared had Tg of 155° C. and IV of 0.55 dL/g.

Comparative Examples 2 and 3

The same procedures as Comparative Example 1 were repeated to prepare a polycarbonate ester, except that the raw materials for polymers were as described in Table 1 below.

Test Example: Evaluation of Physical Properties

The polycarbonate esters of Examples 1 to 10 and Comparative Examples 1 to 3 were each evaluated for their physical properties by the following methods. The measured physical properties are shown in Table 1 below.

Measurement of Glass Transition Temperature (Tg)

The glass transition temperature was measured using a differential scanning calorimeter (Q20, TA Instruments) in accordance with ASTM D3418.

Measurement of Light Transmittance (T)

The light transmittance was measured for a specimen having a thickness of 4 mm using a spectrophotometer (CM-3600A, Konica Minolta) in accordance with ASTM D1003.

Measurement of Melt Flow Index (MFI)

The melt flow index was measured using a melt indexer (G-01, TOYOSEIKI) under the conditions of 260° C. and a load of 2.16 kg in accordance with ASTM D1238.

TABLE 1

| | ISB | CHDM | DPC | DPCD | DPT | Tg (° C.) | T (%) | MI (g/10 min) |
|---|---|---|---|---|---|---|---|---|
| Ex. 1 | 1 | 0 | 0.8 | 0.1 | 0.1 | 168 | 92 | 72 |
| Ex. 2 | 1 | 0 | 0.7 | 0.2 | 0.1 | 164 | 92 | 100 |
| Ex. 3 | 1 | 0 | 0.6 | 0.2 | 0.2 | 172 | 92 | 71 |
| Ex. 4 | 1 | 0 | 0.5 | 0.2 | 0.3 | 180 | 91 | 41 |
| Ex. 5 | 1 | 0 | 0.4 | 0.3 | 0.3 | 178 | 92 | 70 |
| Ex. 6 | 1 | 0 | 0.3 | 0.4 | 0.3 | 174 | 92 | 99 |
| Ex. 7 | 1 | 0 | 0.2 | 0.4 | 0.4 | 182 | 91 | 69 |
| Ex. 8 | 1 | 0 | 0.1 | 0.4 | 0.5 | 190 | 91 | 39 |
| Ex. 9 | 1 | 0 | 0.3 | 0.3 | 0.4 | 185 | 91 | 42 |
| Ex. 10 | 1 | 0 | 0.2 | 0.3 | 0.5 | 193 | 90 | 14 |
| C. Ex. 1 | 0.8 | 0.2 | 0.7 | 0 | 0.3 | 155 | 90 | 35 |
| C. Ex. 2 | 0.8 | 0.2 | 0.6 | 0.1 | 0.3 | 152 | 91 | 65 |
| C. Ex. 3 | 0.7 | 0.3 | 0.6 | 0 | 0.4 | 154 | 89 | 37 |

As shown in Table 1 above, the highly heat-resistant, bio-based polycarbonate esters prepared from diphenyl terephthalate (DPT) represented by Formula 5 in Examples 1 to 10 according to the process of the present invention had high glass transition temperatures as compared with the conventional bio-based polycarbonate ester copolymerized from DPC and 1,4-diphenyl-cyclohexanedicarboxylate (DPCD) alone. Thus, the highly heat-resistant, bio-based polycarbonate esters are suitable for applications that require high heat resistance.

In addition, as the content of the repeat unit of DPCD increases (Examples 1, 2 and 4 to 6), the glass transition temperature is lowered as the content of the aliphatic ring monomer increases. But the melt flow index increases, resulting in an increased flowability.

Further, it was confirmed that as the content of the repeat unit of DPT increases (Examples 2 to 4 and 6 to 8), the glass transition temperature was elevated whereas the melt flow index was decreased. In particular, in Example 3, the melt flow index is similar even though the glass transition temperature is higher than that of Example 1. In Example 7, the melt flow index is similar even though the glass transition temperature is higher than those of Examples 1 and 3. In addition, in Example 10, the glass transition temperature had the highest value among the Examples, but the melt flow index was relatively low due to the low content of the repeat unit of DPCD.

In addition, the light transmittance values in Examples 1 to 10 were all 90% or more, which is equal to, or higher than, the maximum light transmittance of 90% of BPA-based polycarbonate products that have the same level of heat resistance. In particular, the light transmittance values in Examples 1 to 9 were more excellent as 91% or higher.

Meanwhile, the bio-based polycarbonate esters prepared from 1,4-cyclohexanedimethanol (CHDM) in Comparative Examples 1 to 3 had low glass transition temperatures. Thus, they are not suitable for applications that require high heat resistance. The melt flow indices were not high even though the glass transition temperatures were relatively low as compared with the Examples. In particular, in Comparative Example 3, the light transmittance was reduced as the content of the repeat unit of DPT was increased.

Accordingly, in the process of the present invention, it is possible to control the properties of the bio-based polycarbonate ester attributable to the advantages and disadvantages of the carbonate bond and the ester bond by adjusting their ratios as well as the contents of the repeat units of 1,4-diphenyl-cyclohexanedicarboxylate and diphenyl terephthalate, depending on the target properties of high heat resistance thereof. The highly heat-resistant, bio-based polycarbonate ester prepared by the process is excellent in heat resistance, transparency, and flowability. Thus, they can be advantageously used in various applications that require high heat resistance.

The invention claimed is:

1. A heat-resistant, bio-based polycarbonate ester, comprising:
a repeat unit 1 of the following Formula 1;
a repeat unit 2 of the following Formula 2;
a repeat unit 3 of the following Formula 3:

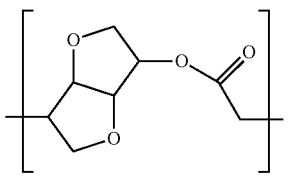

Formula 1

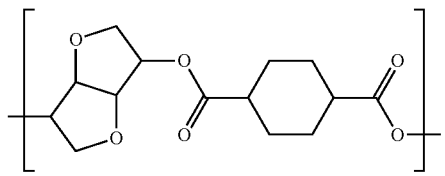

Formula 2

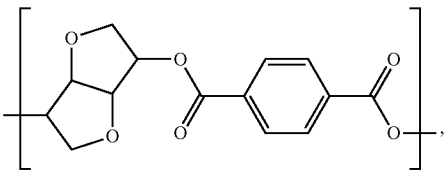

Formula 3 wherein the repeat unit 3 is obtained from a reaction of 1,4:3,6-dianhydrohexitol and a compound represented by the following Formula 5,

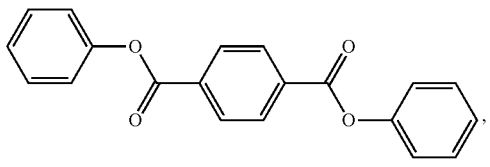

Formula 5 and
wherein molar fractions of the repeat units 1 to 3 are x, y, and z, respectively, x being a real number of greater than 0 to less than 1, y being a real number of greater than 0 to 0.7, z being a real number of greater than 0 to 0.6, and wherein the heat-resistant, bio-based polycarbonate ester exhibits a melt flow index of 5 to 150 g/10 min, measured at 260° C. under a load of 2.16 kg.

2. The heat-resistant, bio-based polycarbonate ester of claim 1,
wherein the compound represented by the Formula 5 is obtained by converting a compound represented by the following Formula 4 to an intermediate reactant having a halogen functional group at the terminal thereof, followed by a nucleophilic reaction with phenol or a phenol substituent, or subjecting a compound represented by the following Formula 4 to a transesterification or esterification reaction with phenol or a phenol substituent;

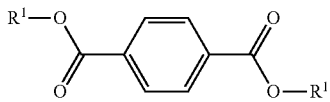

Formula 4 wherein $R^1$ is methyl or hydrogen.

3. The heat-resistant, bio-based polycarbonate ester of claim 1,
wherein the repeat unit 1 is obtained from a reaction of 1,4:3,6-dianhydrohexitol and a compound represented by the following Formula 7, and the repeat unit 2 is obtained from a reaction of 1,4:3,6-dianhydrohexitol and a compound represented by the following Formula 6,

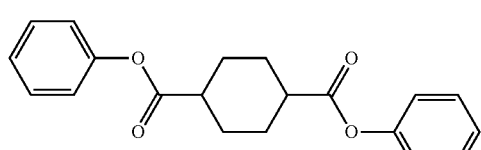

Formula 6

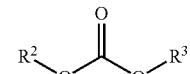

Formula 7 wherein $R^2$ and $R^3$ are each an alkyl group having 1 to 18 carbon atoms or an aryl group having 6 to 18 carbon atoms, wherein the aryl group optionally has one or more substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent.

4. The heat-resistant, bio-based polycarbonate ester of claim 1, which is composed of the repeat units 1 to 3, and x+y+z is 1.

5. The heat-resistant, bio-based polycarbonate ester of claim 2, wherein the intermediate reactant having a halogen functional group at the terminal thereof is a compound represented by the following Formula 8:

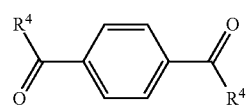

[Formula 8]

wherein $R^4$ is each independently F, Cl, or Br.

6. The heat-resistant, bio-based polycarbonate ester of claim 5, wherein a molar ratio of the compound represented by the above Formula 8 to phenol or the phenol substituent is 1:1 to 5.

7. The heat-resistant, bio-based polycarbonate ester of claim 2, wherein the intermediate reactant having a halogen functional group at the terminal thereof is prepared by reacting the compound represented by the above Formula 4 with a halogenated compound, and the halogenated compound is one or more selected from the group consisting of phosgene, triphosgene, thionyl chloride, oxalyl chloride, phosphorus trichloride, phosphorus pentachloride, phosphorus pentabromide, and cyanuric fluoride.

8. The heat-resistant, bio-based polycarbonate ester of claim 3, wherein the compound represented by the above Formula 7 is diphenyl carbonate or substituted diphenyl carbonate.

9. The heat-resistant, bio-based polycarbonate ester of claim 3, wherein the heat-resistant, bio-based polycarbonate ester further comprises an additional diphenyl ester compound other than the compounds represented by the Formulae 5 and 6, when a molar ratio of the additional diphenyl ester compound is p, a molar ratio of the compounds represented by the above Formulae 5 to 7 employed is to be 1-p, wherein the additional diphenyl ester is prepared by reacting a primary, secondary, or tertiary dicarboxylate or dicarboxylic acid with phenol or a phenol substituent, and the additional diphenyl ester compound is one kind or a mixture of two or more kinds.

10. The heat-resistant, bio-based polycarbonate ester of claim 1, which has a glass transition temperature of 160 to 240° C.

* * * * *